(12) United States Patent  
Gauger

(10) Patent No.: US 7,784,934 B2  
(45) Date of Patent: Aug. 31, 2010

(54) METHOD FOR VIEWING TWO-DIMENSIONAL IMAGES IN 3-D

(76) Inventor: Becky Lynn Gauger, 822 N. Peachtree, Ponca City, OK (US) 74601

( * ) Notice: Subject to any disclaimer, the term of this patent is extended or adjusted under 35 U.S.C. 154(b) by 31 days.

(21) Appl. No.: 11/786,569

(22) Filed: Apr. 12, 2007

(65) Prior Publication Data

US 2008/0018859 A1   Jan. 24, 2008

Related U.S. Application Data

(60) Provisional application No. 60/797,432, filed on May 4, 2006.

(51) Int. Cl.  
*G02C 7/16* (2006.01)

(52) U.S. Cl. ........................... 351/45; 351/46

(58) Field of Classification Search .................... 351/45, 351/46, 41, 44, 56, 158  
See application file for complete search history.

(56) References Cited

U.S. PATENT DOCUMENTS

| 1,959,915 A | | 5/1934 | Guthrie | |
| 3,876,294 A | * | 4/1975 | Kanbar et al. | ................. 351/46 |
| 4,810,057 A | | 3/1989 | Dunkley | |
| 5,151,720 A | * | 9/1992 | Kanbar | ....................... 351/46 |

\* cited by examiner

*Primary Examiner*—Hung X Dang

(57) ABSTRACT

These lenses or glasses made with these lenses will allow people to watch any movie in 3-D without the need for special filming, additional electronics, conversion programs, or software. Normal 2-D movies may be viewed in 3-D with these glasses. And it will work with virtually any type of video presentation, as well as print media and art. As an added benefit, the lenses also improve overall image quality by filtering out interference patterns, without the need for electronic editing. This is especially useful for viewing old videos or low grade images. These glasses make it easy, convenient, and comfortable to view any movie in 3-D, even if the movie was not specifically created for 3-D viewing.

6 Claims, 1 Drawing Sheet

METHOD FOR VIEWING TWO-DIMENSIONAL IMAGES IN 3-D

CROSS-REFERENCE TO RELATED APPLICATIONS

I would like to claim the benefit of previous filing date of provisional patent application Ser. No. 60/797,432. Filed date May 4, 2006. Confirmation No. 8896. Inventor name, Becky Gauger. Title: Video enhancement by use of pinhole lens.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Three dimensional viewing of two dimensional images. Viewing video or graphic images with greater clarity, focus, and increased perspective, atmospheric perspective, and depth perception creating a more realistic and more three dimensional image. Especially useful for viewing video and television in 3-D without need for special filming, conversion technology or additional electronics.

There are three main types of 3-D in common use, especially for video use. Stereoscopic (also called anaglyph) Pulfrich, and Chromadepth.

All three of these types of 3-D require special filming and binocular vision to create the illusion of 3-D, which makes them unsuitable for viewing normal movies and video images in 3-D.

Stereoscopic 3-D is created by filming two different angles of the same image then using glasses that differentiate between the images to combine them. Most often this is done through the use of anaglyphs, pictures where one angle is shot to register through a red lens, and the other angle through a green or blue lens. This requires special filming, binocular vision, and color perception. Because of the need to use different colored lenses over each eye colors are distorted in the resulting picture.

Stereoscopic 3-D can also be created by filming the pictures to be differentiated by using polarized glasses. This creates more realistic colors in the final picture but still requires special filming and binocular vision.

Shutter glasses are also often used, the electronic glasses designed to "shutter" themselves at high speeds as the different views are presented so that each eye only receives the images designated for that eye. This also requires coordination between the glasses and the equipment presenting the pictures. Thus requiring more electronic equipment.

Stereoscopic 3-D requires special filming, binoculars vision (two eyes) and often color perception (if using different colored lenses such as the red/green or red/blue glasses). The limitations of this method are that the movies must be specially filmed, they must have the required glasses with the specified lenses in the correct order. This method requires binocular vision, color perception, and special filming. This means that people who are color blind, or who have only one eye, cannot use this particular type of 3-D. It also means that only those movies which are specially filmed can be viewed in 3-D. Therefore the vast majority of television programs, movies, and other media cannot be seen in 3-D using this process.

Pulfrich 3-D uses a method whereby using one clear lens and one dark lens, it delays the image reception in one eye, causing each eye to see a different frame in a series of images and incorporates them into a single three-dimensional picture. This method requires special filming, since the image must contain movement and the movement must continue in a single direction. Still scenes, scenes where motion is toward or away from the camera, or motion in the opposite direction from that dictated by the glasses, are not interpreted as 3-D. This also requires binocular vision, and special filming. Since all the motion must continue unbroken in one direction this severely limits the types of video which may be presented in this format.

ChromaDepth method separates out the color spectrum causing the red end of the spectrum to appear closer to the viewer, with green at the middle distance, and blue in the background. ChromaDepth images must be specially made to take advantage of this. But it only works on images where the specific color spectrum is taken into account. This method works on still images, as well as video images, and may be used with only one eye, but requires color perception and it is limited to images where contrasting colors are used and red is always in the front and blue behind. This severely limits its practical use.

Pinhole 3-D glasses in the prior art with an adjustable pinhole and forward extending tubes used to frame the image (U.S. Pat. No. 4,810,057) have been used to enhance regular images into 3-D. However, the use of a single pinhole severely limits the field of view and causes a "tunnel vision" effect, were only the area within that single pinhole can be seen. This blocks peripheral vision and can cause a very uncomfortable "claustrophobic" effect in viewers. Having vision limited to a single pinhole, with only that area straight ahead visible, is very physically and psychologically uncomfortable for many viewers and is not something most people are comfortable with, especially for the long periods of time needed to watch most movies and television programs. The bulky forward extending tubes also increase discomfort, as it produces a feeling of being closed in, and the weight is a strain on the neck, and prevents people from wearing prescription lenses over the device, rendering it unusable for people who need prescription glasses to see clearly. (My invention eliminates the need for a heavy, bulky device. The lenses can be worn in a simple, lightweight pair of eyeglass frames. The plurality of holes not only increases the area of view, [which is also good for viewing widescreen presentations], but also provides different widths of eye positions to accommodate the eye positions of a wide range of people, including children and adults. Since the holes and spacings are small, only small adjustments are needed to the position of the holes over the eyes and can be achieved simply by bending or twisting the frames, earpieces, and nosepieces in order to bring the openings into alignment with the eyes. This eliminates the need for bulky devices, or mechanical adjustment controls.)

One embodiment of my invention, consists of a simple, thin lens that may be worn close to the face, it is light, comfortable, and may be worn under or over prescription glasses comfortably, thereby making it available to the large portion of the population who wears prescription glasses as well as those who do not. By using a plurality of holes, with the holes carefully positioned to just barely overlap, I'm able to open out the area of view, making it more physically and psychologically comfortable to see through. Since vision is not restricted to a single point, the viewer's eyes are not forced to stay focused on a single point but can pan normally, and see a greater field of view. Also by proper positioning of the holes the focal area of each hole will just barely overlap the focal area of the holes on each side, which blocks out the appearance of the solid divider between the holes, this creates the illusion of a single wide field of view, with a minimum of distortion, without losing the effect. A single row of holes can limit confusing rays and bleedthrough, which means more of the area of the hole remains in clear focus. Although limiting the number of holes reduces the amount of light available to the eye, viewing a video source such as a television, monitor, or screen provides a direct source of light that the glasses allow through, making them perfect for viewing television, film, and other forms of light producing images.

The pinhole effect is made up of several different effects that are separate but are created and work together.

First—By narrowing the aperture of view, focus is increased. This creates a sharper, more defined image.

Second—Depth perception is increased—causing images in the background to seem farther away, objects in the foreground look closer, and objects in the middle distance are spaced more realistically part. This also returns more natural realistic contours to a single object or person by interpreting which parts are closer and which are farther away. For example, a person's ears will look like they're farther back on the sides of a person's head, their nose seems to project farther forward. (Normal camera lenses tend to foreshorten perspective which slightly flattens a picture, this causes the ears and sides of the face to seem like part of the front of the face which makes the person look fatter. Hence the actor's saying that "The lens adds ten pounds." These lenses correct that so that the person looks more realistically three dimensional.)

Third—Atmospheric perspective is increased. This defines where objects are in relation to one another based on atmospheric perspective cues. An object in the center of a two dimensional picture may be clearly focused with a fuzzy (out of focus) yet similarly sized object on both the right and left of it. Atmospheric perspective cues (such as the shift to blue in distant objects like mountains) enhance the relative distances of the objects and reveals that one is closer to the viewer and the other is farther away, even though it may not be obvious in the 2-D view. Atmospheric perspective is also what creates the illusion that images are solid objects separated by air or atmosphere. This increases the area of "space" within the image as well as clarity of that space. This feeling of "space" prevents the background from being pulled forward into the area around objects. The background is pushed back which creates a greater illusion that you are looking at a three-dimensional space, rather than just a flat image.

Fourth—The pinhole effect also filters out interference patterns such as graininess, pixelation, sound lines, scan lines, snow, digital distortions, etc. This creates a more solid, integrated looking picture. And by removing the interference patterns overlaying the image the colors become clearer and more vivid. The overall clarity (as in clear skies as opposed to smoggy skies) of the image is improved, making the image look more like real life, more smoothly solid and less like a printed or video encoded image made up of small bits. This is also useful for watching low grade digital pictures or old movies or video tapes that have degraded over time, since the glasses automatically clean up and sharpen the picture.

Fifth—The pinhole effect also naturally incorporates a mild color separation effect similar to ChromaDepth without using prisms and can be used to view ChromaDepth images. However, the color separation does not seem to be limited to the same hierarchy as ChromaDepth since a blue image can seem to be closer than a red image or vice versa. This effect seems to rely upon other cues as well as color separation to place objects within the picture.

Sixth—The pinhole effect can also be used to view Pulfrich video because Pulfrich is filmed in normal 2-D which the pinhole effect enhances into 3-D. In the case of the pinhole effect a specific direction of movement or movement at all is unnecessary.

Seventh—Pinhole 3-D, since it works in a completely different way than stereopsis, can be used in conjunction with stereoscopic viewing glasses to enhance the 3-D effect of stereoscopic filmed images.

Summary—Unlike previous forms of 3-D which require the movie itself to be altered, this type of 3-D pinhole lens can be used to view regular 2-D images in 3-D without special filming, without electronic conversions, and can be used by people who wear prescription glasses, are colorblind, or use only one eye. The effect can be used to view still or motion images, color or black-and-white, standard or high-definition, photographs or art. It can also be used to improve the appearance of low quality images, such as old videotapes, by filtering out interference patterns. The lenses are lightweight, simple to use, comfortable, and can be used in conjunction with prescription glasses, prescription lenses, or other types of 3-D glasses. All you have to do to view any movie in 3-D is put on the glasses and watch TV.

These glasses may also be made in a variety of hole sizes, spacings, and shapes, as well as different shapes of the overall lens, to best fit different people and different situations—such as adults and children, people with different spaced eyes, or who intend to use them differently for different viewing purposes and distances, or to create different effects, or levels of effect.

Differently spaced and sized lenses may be used interchangeably in a single pair of glasses or frames to better accommodate wearers and situations. Glasses may be custom-made to suit individuals or groups.

The surface of the lenses may be used to display a design for promotional, identification, decorative, or other uses.

Disposable lenses or glasses made using such lenses, may be made for temporary, disposal, or promotional use. Made of temporary or disposable type materials such as paper, cardboard, plastic, vinyl, foam, etc.

Such glasses or lenses may be made using an opaque surface which is flat, or contoured to fit the wearer or to block out extraneous light, to fit more comfortably, or for style.

A pair of glasses using these lenses may also be created to attach to, fit over, or work in conjunction with prescription glasses to view images in 3-D. Or prescription lenses may be made or adapted to mimic these lenses, (for example by blocking all but the hole areas of the prescription lens with some opaque substance) to view images in 3-D.

A pair of these glasses may also be made or adapted so that the holes may be used to view stereoscopic images (such as by making the holes of one lens red, and in the other lens green or blue, or using polaroids. Or by incorporating them into shutter glasses.) thus enhancing the 3-D effect.

ULTRA SUMMARY

This one pair of 3-D glasses will allow you to view virtually any 2-D image in 3-D.

BRIEF SUMMARY OF THE INVENTION

The purpose of this invention is to alter the perspectives of a two dimensional image in order to create the illusion of a three dimensional image. One embodiment is a simple, lightweight lens that can be used in normal sunglasses frames, which, when a person wears them and aligns them correctly while watching television, allows the viewer to view a regular, unaltered, two dimensional image in 3-D. This invention eliminates the need for special filming, conversion techniques, or additional electronics to view movies, television, videos, films, and other images in 3-D. The effect does not rely upon color recognition, motion, or even binocular vision. It does not distort colors (like the old red/green or red/blue 3-D glasses do) but provides a clear, color-true image. By creating the three dimensional effect in a way completely different than stereoscopic 3-D these glasses can also be used in conjunction with other types of 3-D glasses to increase the perceived 3-D effect. The glasses may also be used to increase the image quality of old or low grade images by increasing focus and filtering out interference patterns.

DETAILED DESCRIPTION OF THE INVENTION

Figure 1:
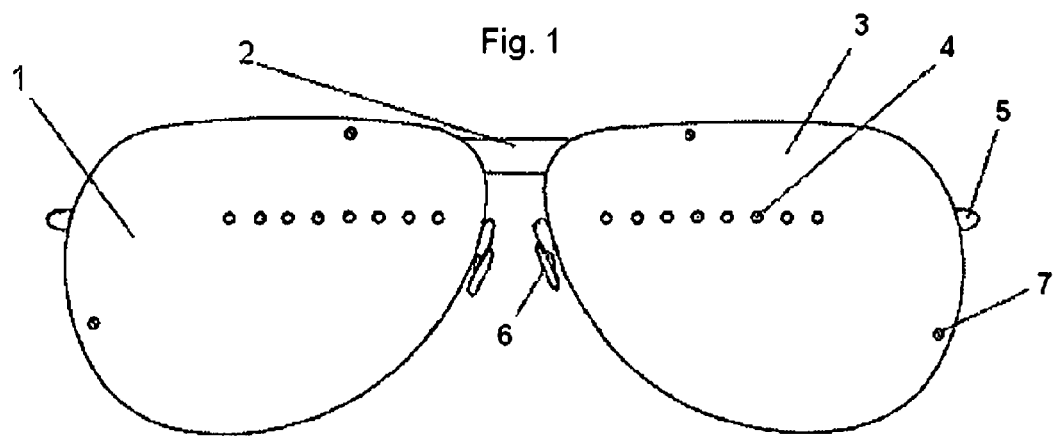
FIG. 1 is a perspective view of one embodiment of the viewing apparatus.
1. 3-D viewing lens
2. Eyeglass frames
3. opaque surface element
4. Openings or nonopaque areas
5. earpieces
6. adjustable nose rests
7. screws or bolts for attaching the lens to the frame.
Figure 2:
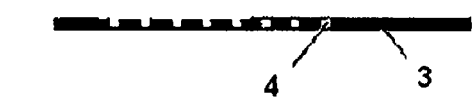
FIG. 2 is a cutaway edge view of the viewing lenses in FIG. 1 showing opaque surface and openings or nonopaque areas.

The main portion of this patent is for an opaque surface element with a plurality of openings or non-opaque areas positioned on the opaque surface level with the direction of view (1) that will allow viewers to watch 2-D movies or images in 3-D. The opaque surface element may serve as the lens or lenses of a pair of eyeglass frames (FIG. 1), or the lens or lenses of a hand held frame, or attached to or made part of prescription lenses or glasses. The opaque surface element may also be wide enough to cover both eyes (10), and the plurality of openings or non-opaque areas wide enough to cover both eyes (11) or divided into two sets of single row openings or non-opaque areas with one set each positioned in front of each eye. The sides may extend to become earpieces (10) or other means for securing the device to the head.

Holes or non-opaque openings may be any shape (11) and of any size, sizes ranging from $\frac{1}{32}$ inch to $\frac{1}{4}$ inch. The spacing of the openings or nonopaque areas in each lens should measure one to three times the size of the openings or nonopaque areas from center to center of the openings.

One embodiment of the invention is an apparatus for viewing two dimensional images in 3-D consisting of an opaque surface (3) with a horizontal row of openings or nonopaque areas (4), two of such being utilized as the lenses for a pair of eyeglasses, having bendable eyeglass frames (2), having bendable nosepieces (6), and bendable earpieces (5). With the lenses attached to the frame in a manner that allows independent movement of the lenses. Methods may include threaded elements such as screws (7) or holding the lens onto the frame by screwing into the surface of the lens and holding it in place by pressure, or using a clamp, or inserting a broad headed bolt or bolt and washer into a hole that is a larger than the bolt, allowing for some leeway of movement around the bolt for repositioning of the tens in relation to the frames before tightening to hold it in place.

The opaque element lens may be positioned in the frames so that corresponding openings or nonopaque areas in right and left lenses measure the average human eye distance apart or 2$\frac{1}{4}$ inches to 2$\frac{1}{2}$ inches apart measured from center to center of the openings. One spacing of the openings in each lens is three times the size of the openings minus $\frac{1}{8}$ to $\frac{1}{2}$ the size of the openings or nonopaque areas.

Metal or other semi-flexible material frames will allow the viewer to adjust the position of the lenses to best suit their individual eyes.

A black matte or nonreflective interior surface prevents distracting images from mirroring on the interior of the lens and absorbs any stray light. A matte exterior surface prevents light from reflecting onto the surface of prescription glasses if worn over the 3-D glasses. The lenses may be attached to metal eyeglass frames by bolts or screws to allow for independent freedom of movement of each lens, and allows the frames to be bent, twisted or stretched to reposition the lenses over the viewers eyes. Lenses may be of a size to block out extraneous light, and may be curved or shaped to fit closely to the viewers face over the eyes to provide comfort, as well as blocking light, and providing a low profile to allow the wearing of normal prescription glasses over them.

The adjustment of the position of the openings to allow for each person's best, view is important, because a slight convergence or divergence of alignment from center is what makes the 3D effect possible (Note to examiner: This is not new matter, but a clarification of why the already mentioned adjustment is needed). Each person's eyes are positioned and spaced differently. The wearer adjusts the glasses to suit the positioning of their own eyes by bending, stretching, twisting, or otherwise repositioning the frames, or by moving the lenses in relation to the frames. Nosepieces and earpieces may also be repositioned to provide the best fit. Glasses can be tilted in vertical relation to the face by bending the earpieces up or down, they can also be bent individually to compensate for eyes or ears that are on different levels. Earpieces can be bent to create a wider profile for a wider face, or a narrower profile to fit narrower faces, or to fit more easily under prescription glasses. The main part of the frames which hold the lenses can be bent into a deeper or shallower curve to bring the openings closer together or farther apart to fit the viewers eye distance apart, or to fit them more comfortably and snugly to the wearers face or to block out extraneous light. The halves of the frame holding each lens can also be bent at the nosebridge (2) into more of a right angle which will move the openings in each lens closer or farther apart depending upon the direction of the bend, this also allows one lens to be bent and not the other, or for each side to be bent in a different degree or angle. The nosepieces can be bent towards the face to push the frames forward, farther from the face, or narrower to bring the lenses closer to the eyes. The nosepieces can also be bent to the right or the left to shift all of the openings to the right or the left to better suit the viewers eyes. Since adjustments to the position of the openings would only need to be very small, because of the multiple choice of viewing holes, all of these simple adjustments together (up, down, left, right, forward, back, angular, radial, or independent) allow a wearer to adjust the position of the openings to virtually any position necessary to provide a clear, comfortable view without the need for bulky adjustment control mechanisms. And since the apparatus is already designed to suit the size and position of the average person's eyes most people don't require any more adjustment than simply shifting the glasses on their face.

Figure 3:
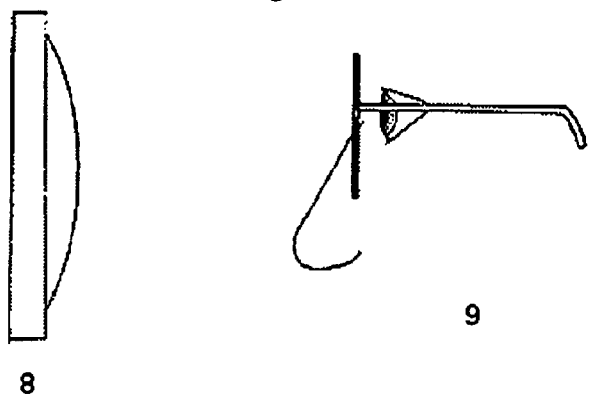
FIG. 3 is a side view illustration of the invention in use
8. Video screen (television, computer monitor, film screen, or other display)
9. Viewer wearing 3-D viewing apparatus.
Figure 4:
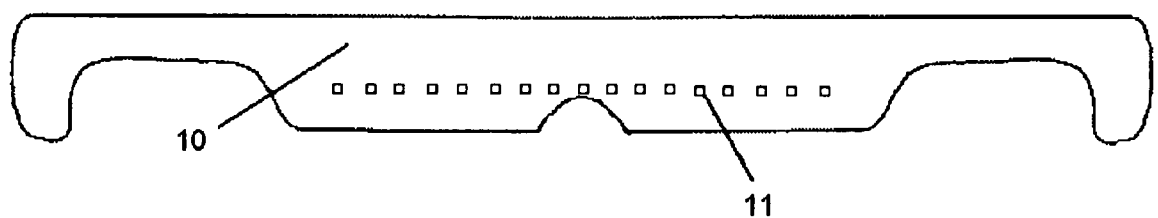
FIG. 4 is another embodiment of the invention, a single opaque surface element with earpieces and a row of square openings
10. An opaque surface element wide enough to cover both eyes.
11. a row of square openings.

To use the apparatus once adjusted (FIG. 3) a person simply wears it (9) while viewing a two dimensional image, movie, television show, film, or other image (8) and it appears more three dimensional, as well as clearer, and less prone to interference patterns or visual noise.

Alternate forms include, but are not limited to:

Lenses made with any opaque material, perforated with holes or containing nonopaque areas or openings. One assembly of the device would be in the form of glasses worn by people of normal vision. Or worn over prescription contacts or worn over, under, or utilizing a means to attach them to prescription lenses. TV viewing glasses may also be created by applying an opaque film to the surface of normal or prescription lenses. Opaque perforated films or other opaque substance may be applied to lenses in either a permanent or temporary manner, such as permanent or peel away films, tints, paints, dyes, etching, or other methods of causing the lenses to be opaque except in the area of the apertures. Or a screen with holes or transparent areas may be embedded within the lens. If the glasses are custom-made, the central focal aperture can be specifically situated over the central focal point of the eye. Simple glasses and/or lenses may be created from paper, cardboard, plastic, vinyl, rubber, or other materials.

Lenses may be made with any opaque material with holes or transparent areas.

I claim:

1. A pair of 3D glasses comprising a pair of eyeglass frames, a pair of opaque surface elements with a plurality of small holes or non-opaque areas used as the lenses for the glasses, and a means of altering or repositioning the position of the holes before the wearers eyes to align the holes in the proper position to provide a clear view, with the correct degree of offset to create the 3D effect when viewing a 2D image or video—the degree of adjustment depending upon the interpupilary distance of the wearer's eyes, and the distance to the image or video screen.

2. The pair of 3D glasses according to claim 1 where the frame is a pair of eyeglass frames with the lenses attached to the front or back.

3. The pair of 3D glasses according to claim 1 where the frame is bendable.

4. The pair of 3D glasses according to claim 1 where the frame is made of metal or other bendable material.

5. Where the lenses of the pair of 3D glasses according to claim 1 are attached to the frames by means of nuts, bolts, screws, clamps, or other means which allow the repositioning of each lens on the frame.

6. The pair of 3D glasses according to claim 1 where the method of adjusting the glasses is for the viewer to wear the glasses and view the video screen or 2D image.
   a) adjust the position of the holes to align with the eyes for clearest view through the center of the holes before each eye
   b) adjust the position of the holes before each eye by moving the interpupilary distance of the holes slightly closer together, or farther apart, to create a degree of convergence or divergence so that the viewer is looking through the holes slightly off center
   c) continuing this adjustment until the viewer finds the correct positions of the holes that makes the image look deeper or more three dimensional.

* * * * *